United States Patent [19]

Ames et al.

[11] Patent Number: 5,379,448

[45] Date of Patent: Jan. 3, 1995

[54] LOAD BALANCING IN A DIGITAL COMMUNICATIONS NETWORK USING RADIO LINKS

[75] Inventors: Richard N. Ames; Thomas W. Kludt, both of Boca Raton; Victor S. Moore, Delray Beach, all of Fla.

[73] Assignee: International Business Machines, Armonk, N.Y.

[21] Appl. No.: 740,753

[22] Filed: Aug. 5, 1991

[51] Int. Cl.[6] .......................................... H04B 15/00
[52] U.S. Cl. ................................. 455/33.4; 455/34.1; 455/34.2; 455/56.1; 455/62
[58] Field of Search ................... 455/33.1, 33.4, 34.1, 455/34.2, 56.1, 62, 63; 375/38, 107

[56] References Cited

U.S. PATENT DOCUMENTS

| | | | |
|---|---|---|---|
| 3,983,492 | 9/1976 | Fischer et al. | 455/62 |
| 4,251,865 | 2/1981 | Moore et al. | 395/325 |
| 4,354,252 | 10/1982 | Lamb et al. | 395/200 |
| 4,430,753 | 2/1984 | Shiratani | 455/62 |
| 4,545,071 | 10/1985 | Freeburg | 455/33.4 |
| 4,596,042 | 6/1986 | Stangl | 455/33.4 |
| 4,669,107 | 5/1987 | Eriksson-Lennartsson | 455/33.4 |
| 4,670,899 | 6/1987 | Brody et al. | 455/33.4 |
| 4,783,780 | 11/1988 | Alexis | 455/33.4 |
| 4,804,937 | 2/1989 | Barbiaux et al. | 340/459 |
| 4,829,519 | 5/1989 | Scotton et al. | 455/33.4 |
| 5,181,200 | 1/1993 | Harrison | 455/56.1 |
| 5,239,673 | 8/1993 | Natarajan | 455/33.4 |
| 5,241,685 | 8/1993 | Bodin et al. | 455/56.1 |
| 5,241,686 | 8/1993 | Charbonnier | 455/62 |

*Primary Examiner*—Reinhard J. Eisenzopf
*Assistant Examiner*—Andrew Faile
*Attorney, Agent, or Firm*—George E. Grosser; Douglas R. McKechnie

[57] ABSTRACT

A digital communication network has a plurality of remote terminals (RTs) which communicate with a plurality of base stations (BSs) by radio links operating at a single frequency. Each RT monitors the signal strengths of outbound messages and keeps an ordered table indicating which BSs produce the highest strength signals. At sign-on, an RT sends a message to the BS at the top of the list. The message includes the first predetermined number of entries at the top of the list. Each BS monitors the number of RTs it can hear and the number of users attached to each BS. The BS to which the sign-on message is sent then decides on the basis of signal strength, number of users attached, and BS coverage which BS should be attached to the particular RT and then notifies a communications controller. Such decision thus levels the workload. Each RT monitors errors and requests re-evaluation of attachment when the error rate for the BS to which it is attached exceeds a predetermined value.

17 Claims, 3 Drawing Sheets

FIG. 2

RTBST 70

| BS ID | STRENGTH |
|---|---|
|  |  |
|  |  |
|  |  |
|  |  |
|  |  |

BSWT 48

| WEIGHT |
|---|
|  |
|  |
|  |
|  |
|  |

BSCT 46

| USER (RT ID) |
|---|
|  |
|  |
|  |
|  |
|  |

CCUT 38

| RT ID | BS ID |
|---|---|
|  |  |
|  |  |
|  |  |
|  |  |
|  |  |

CCMQ 40

MESSAGES WITH RT IDs

BS[1]
BS[2]
•
•
•
BS[n]

LOAD BALANCING IN A DIGITAL COMMUNICATIONS NETWORK USING RADIO LINKS

FIELD OF THE INVENTION

This invention relates to improvements in digital communication networks using radio links between a plurality of base stations and remote terminals.

BACKGROUND OF THE INVENTION

The invention was designed as an improvement on a commercially available digital radio network of the type known as ADRIS. Such prior art network comprises an array of antennas covering a predetermined geographical area in which many users, each with a hand held or remote terminal (RT), can communicate with a host computer through a plurality of base stations and one or more communications controllers. The antennas are arranged to provide overlapping coverage and include at least one primary antenna providing a primary area of greater coverage and a plurality of secondary antennas having respective secondary coverage areas within the primary area. All radio transmissions between the base stations and the RTs are made at the same carrier frequency so that the system is frequency limited as to the number of transmissions that can be effectively accomplished at any given time.

Such prior art system, while highly successful, nevertheless has several aspects which the present invention improves upon. First, when an RT sends a message, the message is most likely to be received by more than one base station. Each base station then transmits the message to the communications controller and thence to the host computer. The host computer thus receives duplicate messages, i.e., one message from each of the base stations receiving the transmitted message. When the network is extremely busy and operating at peak loads, the duplicate messages create a bottleneck and thereby restrict system throughput. Thus, one of the objects of the invention is to eliminate duplicate messages from being sent to the host computer. The general manner in which this object is accomplished is by operating the communications controller so that when duplicate messages are received by more than one base station, only one message is transmitted from the controller to the host. The one message is either an error free message received by a base station assigned to be the primary station for communicating with a specific RT, or in the case where the message to the assigned base station includes errors or is lost, an error free message from an unassigned base station.

Second, in the prior art system, when a sign-on message is received by a base station, the signal strength of the received transmission is measured by the base station. The base station then composes and sends to the communications controller a message which includes the signal strength and the ID of the RT sending the sign-on message. Since it is likely that a sign-on message will be received by more than one BS, duplicate sign-on messages are received by the CC. The CC then assigns the BS receiving the highest strength signal to the RT requesting a sign-on or attachment. The CC creates a table of assignments and sends such information to the host so that the host knows which BS is attached to which RT. Thus, another object of the invention is to avoid sending duplicate sign-on messages to a CC. This is accomplished by distributing the sign-on and attachment decision making process to the BSs and the RTs.

Third, making attachment decisions on the basis of signal strength does not permit "load leveling". Load leveling is a novel feature of the invention by which the attachment decision is made on the basis of not only the strengths of signals received by an RT from different BSs but also on the basis of the domain of each BS and the number of users currently attached to each BS. Thus, RTs are attached to BSs having limited range and fewer users thus allowing multiple BSs to use the one available operating frequency and simultaneously communicate with multiple RTs without interference.

Another object of the invention is to monitor the message error rate at each RT and request a re-evaluation, dependent on the error rate, of which BS the RT should be attached to.

Briefly, in accordance with the invention, a digital communication system has a plurality of RTs which communicate with a plurality of BSs by radio links operating at a single frequency. Each RT monitors the signal strengths of outbound messages and keeps an ordered table or list indicating which BSs produce the highest strength signals. At sign-on, an RT sends a message to the BS at the top of the list. The message includes the first predetermined number of entries at the top of the list. Each BS monitors the number of RTs it can hear and the number of users attached to each BS. The BS to which the sign-on message is sent, then decides on the basis of signal strength, number of users attached, and BS coverage, which BS should be attached to the particular RT and then notifies a communications controller.

DRAWINGS

Other objects and advantages of the invention will be apparent from the following description taken in connection with the accompanying drawings wherein:

FIG. 2 is a more detailed diagram illustrating various tables generally shown in FIG. 1.

DETAILED DESCRIPTION

Figure 1:
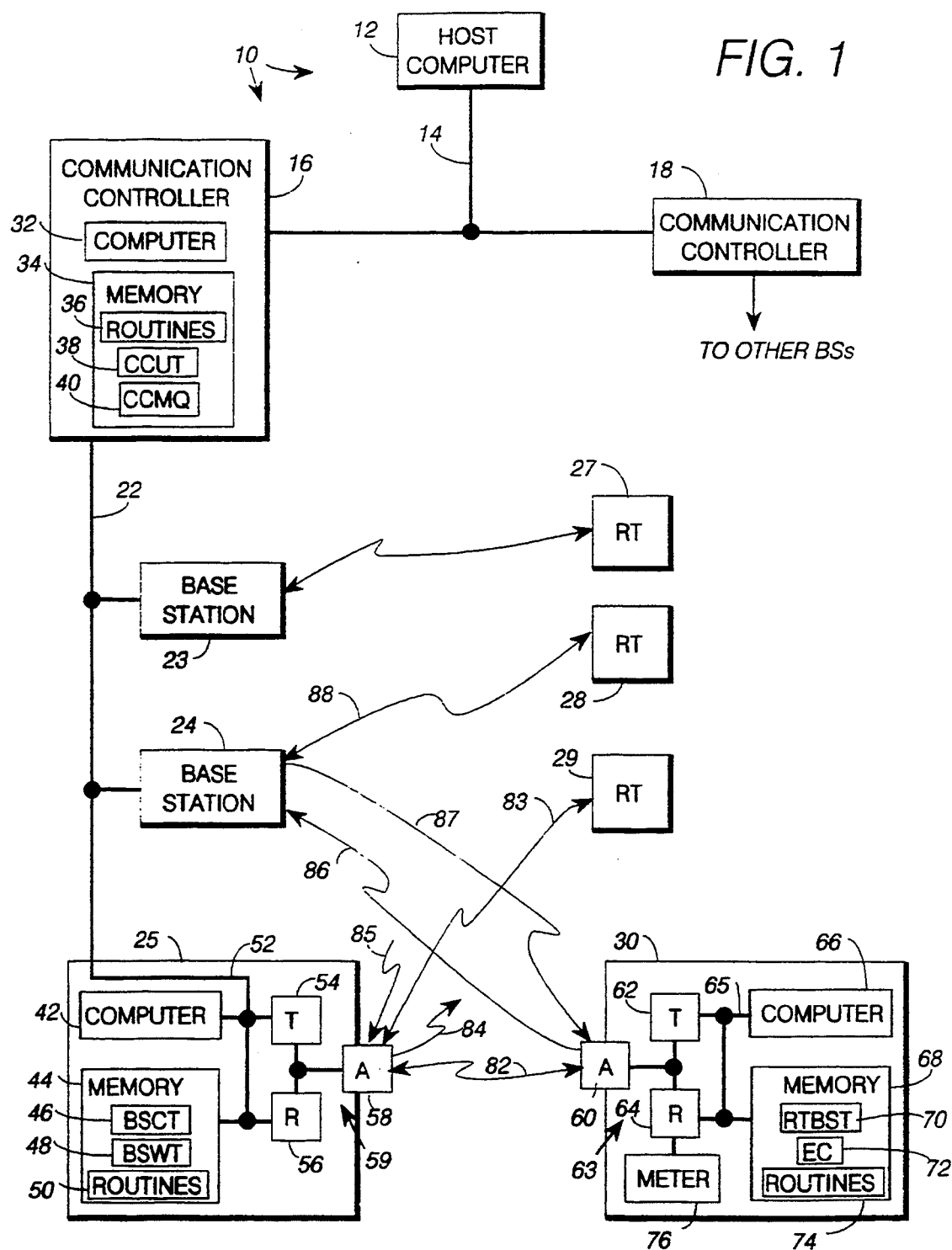
FIG. 1 is a schematic diagram illustrating a digital radio communication system embodying the invention.

Referring now to the drawings, and first to FIG. 1, a digital communication system 10 using radio links, comprises a host computer 12 connected by a bus 14 to a plurality of communication controllers (CC) 16 and 18. CC 16 is connected by a bus 22 to a plurality of base stations (BS) 23–25. A plurality of remote terminals 27–30 are connected by radio links to the base stations.

Each CC may be the same so only one need be described. CC 16 includes a computer 32 and a memory 34 that stores various routines 36 which upon being executed by computer 32 control operation of CC 16. Memory 34 also stores a communications controller user table (CCUT) 38 and a communications controller message queue (CCMQ) 40.

Each BS is also similar to the other BSs so that only one need be described in detail. BS 25 includes a computer 42 and a memory 44. Such memory stores a base station coverage table (BSCT) 46, a base station weight table (BSWT) 48, and various routines for operating BS 25 under the control of computer 42. Such computer is connected by a bus 52 to bus 22 and to a transmitter (T)

54 and a receiver (R) 56 which in turn are connected to an antenna (A) 58. Transmitter 54, receiver 56, and antenna 58 form a transceiver 59 for communicating by radio links with the RTs. The transceiver is operated under control of computer 42 whereby digital messages to be transmitted are sent over bus 25 to transmitter 54 which then digitally modulates a carrier frequency and transmits a digitally modulated radio or electromagnetic packet through space. When a similarly transmitted packet is received from an RT by the base station, receiver 56 then demodulates the received packet and transmits the digital information over bus 25 to computer 42 and memory 44.

Each RT is also similar so that only one need be described in detail. RT 30 comprises a transceiver 63 having an antenna 60 connected to a transmitter 62 and to a receiver 64 both of which are connected by a bus 65 to a computer 66. Transceiver 63 is operated under control of computer 66 whereby digital messages to be transmitted are sent over bus 65 to transmitter 62 which then digitally modulates a carrier frequency and transmits a digitally modulated radio or electromagnetic packet through space. When a similarly transmitted packet is received from a BS by the RT, receiver 64 then demodulates the received packet and transmits the digital information over bus 65 to computer 62 and memory 68. Memory 68 stores a remote terminal base station table (RTBST) 70, an error counter (EC) 72, and various routines 74 that operate RT 30 under the control of computer 66. RT 30 also includes a meter 76 for measuring the field strength of each message received by RT 30 and causing a value indicative of such signal strength to be stored in RTBST 70 as described in further detail below. Error counter 72 stores a count of the number of errors encountered in messages from the base station to which an RT is attached. Receiver 64 includes error detection and correction circuitry. Each time an error is detected in an incoming message, such circuitry generates an interrupt which causes the count in EC 72 to be updated.

The transmitters and receivers in the base stations and remote terminals operate at a predetermined carrier frequency, as in the prior art, and create radio links that interconnect the BSs and the RTs. Each base station is assigned a unique ID and each remote terminal is assigned a unique ID. Transmitted messages are framed into packets and each include the ID of the sending unit and the ID of the receiving unit for which the message is intended. A remote terminal sends three types of messages, a sign-on message, an acknowledge message, and a data message. A sign-on message is sent when an RT is initially powered on and when the error rate exceeds a predetermined value whereby the sign-on message is used to request reevaluation of which BS the RT should be attached to. An acknowledge message is sent in response to a search request attempting to find a given RT. A data message is sent to transmit data to the host computer through the attached base station and communications controller. A base station sends sign-on acceptance messages which tell the RTs which BSs to attach to, data messages to the RSs, and acknowledge messages confirming the receipt of packets from the RTs.

The radio links between the BSs and RTs are of different types as represented by the number and direction of arrow heads on the illustrated links. Link 82 has two arrowheads indicating that RT 30 is "attached" to BS 25 for two way communication therebetween. Link 83 shows RT 29 attached to BS 25 and illustrates that a base station may be attached to a plurality of RTs. However, an RT is attached to only one BS at a time, recognizing that such attachment may be switched to another BS. Link 84 is an outbound message, i.e. an unattached message transmitted by antenna 58, and link 85 is an inbound message, i.e. a message received by antenna 58 from a source other than the RTs to which BS 25 is attached, such as by links 82 and 83. RT 30 also is connected by a link 86 to a BS other than the one to which it is attached so that when a message is sent by RT 30 to BS 25, the same message is also sent to BS 24 to provide for error recovery in the event the message to BS 25 is lost or in error. When BSs other than BS 25 transmit a message, such message may be also received by RT 30 and link 87 represents such a message sent by BS 24 and received by RT 30.

FIG. 2 illustrates the entries to be made in the various tables generally described above. The contents of the tables are managed by routines that are stored in the respective memories in which the tables are created. It is to be understood that, while only six rows are shown for each table for the purpose of simplifying illustration, the actual number of rows and corresponding entries would be set in accordance with the configuration of each network. RTBST 70 two columns of entries, each entry containing a BS ID field and a STRENGTH field. Each RT, when turned on, monitors all the messages received from BSs that the RT can "hear". For each message, the ID of the BS is recorded along with the signal strength of the message signal. Table 70 is sorted on the basis of the STRENGTH entries as each new message is received, so that the base stations producing the highest strength signals as received by the particular RT, are located at the top of table 70. When an RT signs onto the network, it initially sends a sign-on message to the BS at the top of list 70 and includes with the message the contents of the first predetermined (e.g. four) number of entries in the table so as to provide a selection list used to decide which BS the RT should be attached to. While the STRENGTH values represent the strength of the signal received by an RT, they also represent the strength of messages outbound from a base stations and thus differ from the prior art discussed above which uses the strengths of messages inbound to a base station as the basis for making attachment decisions.

In a BS, BSWT 48 contains a number of WEIGHT entries corresponding to the number of base stations attached to the same communications controller. The position of each WEIGHT entry in table 48 identifies the particular base station. WEIGHT is a measure of the desirability of using each BS for communications. A large weight means the BS is not as desirable to use as a BS with a lower weight. WEIGHTS are calculated based on the coverage range of a BS and the number of users attached to a BS. Each entry contains a value representing the WEIGHT accorded to a particular base station in accordance with the following equation:

$$\text{WEIGHT}[n] = (s * CT[n]) + (t * \text{USERS}[n]) \qquad \text{(Eqn. 1)}$$

In such equation, WEIGHT[n] is the WEIGHT value for BS[n], CT[n] is a coverage value obtained by adding the number of entries in table 46, such value representing the total number of RTs which base station BS[n] can hear, USERS[n] is the number of users attached to BS[n] which number is obtained from table 38, and "s" and "t" are constants selected to optimize system throughput.

As each BS calculates its own WEIGHT, it communicates such WEIGHT to the other BSs through the communications controller. Such knowledge is used during the sign-on process to determine which BS an RT should be attached to.

BSCT 46 contains a user ID entry for each RT that a BS can hear. That is, each base station continuously monitors all of the RT messages it receives and places an entry in table 46 identifying each RT. The total number of RTs whose IDs are stored in table 46 denotes the coverage range of the particular base station and how many RTs or users a BS can communicate with. Because plural BSs must share the same frequency, it is desirable to use, where possible, the BS with the smallest coverage range to communicate with an RT.

CCUT 38 is a table having two columns of entries where each entry contains a first field identifying a particular RT signed on to the network and the second field identifies the particular base station to which it is attached. Such entries are made as each RT signs on and the sign-on BS decides which BS the RT should be attached to. Such decision is communicated by a BS to the CC and placed in table 38. If an RT later is attached to a different BS by virtue of a new decision being made, table 38 is appropriately updated. This table is used to direct messages from the host computer to a particular RT through the attached BS. CCMQ 40 is a table in which queues of messages are maintained, there being one queue for each base station connected to the controller. Each entry in table 40 is a message in addition to the data contents of the message also identifies the particular RT. The host computer takes messages off of table 40, e.g. on a first-in, first-out basis, in accordance with its own workload. As messages are transmitted to the host computer, the corresponding entry is deleted and the remaining messages in the associated queue are shifted.

When an RT sends a message to a particular BS, the message may be received by other BSs. These other messages are duplicate messages. Duplicate messages are desired because they increase the probability of good message reception. However, the CC recognizes such duplicate messages and only passes one message to the host computer. The manner in which this is done is simple. A BS only passes good messages to the CC. As the CC receives messages from the BS units, it puts them in the appropriates queues in CCMQ 40. When the CC sees a message in the appropriate queue, it sends the message on to the host. When the CC sees a message in one queue for a BS associated with a different queue, it first looks in the different queue for the original and if an original is found, the duplicate is discarded. If the original is not found, the CC assumes the original is lost or defective and moves the duplicate message into the appropriate queue where is should have gone in the first place. The process is repeated for the entire table 40 until all the messages therein have been passed to the host.

A "domain" is the area or space in which a base station can effectively attach to a remote terminal. The extent of a domain is dependent primarily on the sensitivity of the receiver, power of the BS transmitter, and the transmission and reception characteristics of the BS antenna. The BSs are more powerful and more sensitive than the RTs and are arranged in a given network to provide overlapping domains. The sign-on and attachment procedure is designed to attach Rt units to BS units that have a limited range and few users. This creates regions where multiple BSs can use the same operating frequency simultaneously without interference and thereby optimize system throughput.

Figure 3:
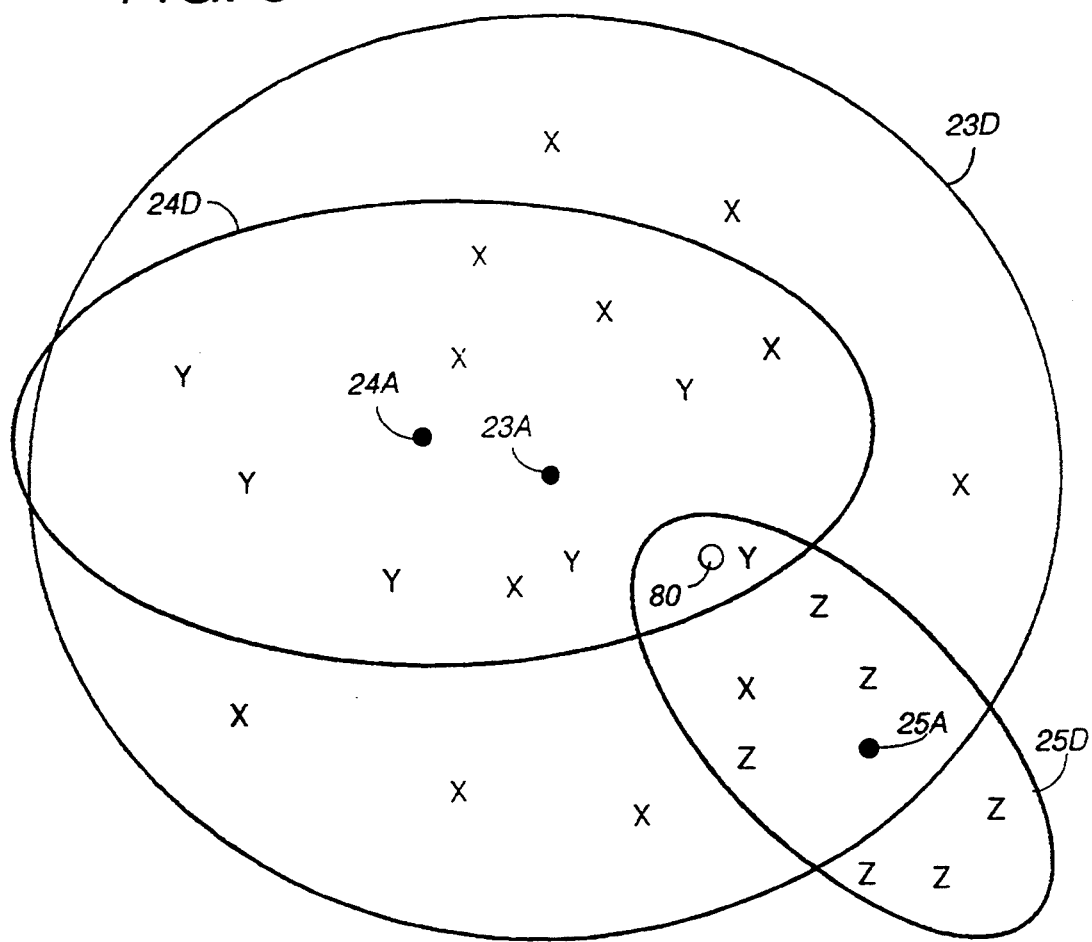
FIG. 3 is a diagram useful in understanding and describing system load leveling in accordance with the invention.

FIG. 3 illustrates the load leveling effect of making an attachment decision in accordance with the manner described above. Assume that base stations 23-25 have their antennas located at different geographical locations 23A, 24A, and 25A and that the BSs have domains 23D, 24D, and 25D covering different predetermined overlapping areas. Domain 23D might provide city wide coverage, while the other two domains cover lesser areas or domains with domain 25D covering the smallest area. BS 23 is attached to twelve RTs located within domain 23D at the positions indicated by the "X" symbols. BS 24 is attached to six RTs located within domain 24D at the positions indicated by the "Y" symbols. BS 25 is attached to six RTs located in domain 25D at the positions indicated by the "Z" symbols. BS 23 hears twenty on RTs, BS 24 hears eleven RTs, and BS 25 hears seven RTs.

Within the example of the preceding paragraph, suppose that a user has an RT 80 located in the area of overlap between domains 23D, 24D, and 25D. When RT 80 is then turned on and powered up, it first monitors messages transmitted from each BS antenna and measures the signal strengths of the messages, and then makes entries in its RTBST 70 sorted by signal strength. RT 80 then transmits a sign-on message to the BS at the top of the list. In the example, RT 80 is closer to location 23A which has a greater domain and therefore produces the strongest signal at RT 80 so that 23 should be at the top of the list. The sign-on message is transmitted identifying BS 23 as the intended recipient and including the top entries in table 70 so that BS 23 can make a selection of one of the listed BSs to attach to RT 80. Thus, the attachment decision is made, in part, based on the signal strengths of messages received by an RT from BSs within whose domains the RT is located.

With the use of Egn. 1 above, BS 23 then makes an attachment decision along the following lines. First, even though BS 23 produces the strongest signal strength, it is not selected because it is attached to more (twelve) RTs than the other two BSs (six apiece) and has greater coverage. BS 23 would have the highest WEIGHT value. Between BSs 24 and 25, each are equally busy terms of the number of units attached, but BS 25 has a lower coverage and therefore the lowest WEIGHT. BS 25 would thus be selected for attachment. After RT 25 is attached, should the signal strength of message from BS 25 cause a high error rate, a reattachment decision can then be made to decide at that time which BS might then be the most appropriate to attach to.

It should be apparent to those skilled in the art that many changes can be made in the details and arrangements of steps and parts without departing from the scope of the invention as defined in the appended claims.

What is claimed is:

1. In a digital communications network having a host computer, a communications controller (CC) connected to said host computer, a plurality of base stations (BSs) connected to said communications controller, a plurality of antennas respectively connected to and included in said base stations, each BS having a predetermined domain within which remote terminals can be attached thereto by radio links operating at a predetermined frequency, said BSs being located so as to provide overlapping domains, and a plurality of remote terminals (RTs) for communicating with said BSs by said radio links, the improvement comprising:

each BS comprising
a radio BS transceiver for transmitting and receiving messages to and from RTs located within the predetermined domain of said BS,
a digital BS processor connected to said BS transceiver for controlling operation thereof,
and a digital BS storage connected to said BS processor for storing BS tables including a base station weight table (BSWT) listing a weight value for at least a portion of said plurality of said BSs and BS routines to be executed by said BS processor;

each RT comprising
a radio RT transceiver,
a field strength meter connected to said RT transceiver for measuring field strengths of messages received by said RT transceiver from BSs within whose domains said RT is located,
a digital RT processor connected to said transceiver for controlling operation thereof,
and an RT digital storage connected to said RT processor for storing an RT table and RT routines to be executed by said RT processor;

each RT being operative to monitor messages from BSs, store within said RT table a list of BSs and signal strengths of messages received therefrom, and transmit to the one of said BSs having the strongest signal strength in said RT table a sign-on message including at least a portion of said RT table list;

each BS comprising decision making means responsive to a sign-on message directed thereto to decide which BS in said portion of said RT table list has the lowest weight value in said BSWT and thus should be attached to an RT transmitting said sign-on message.

2. A digital communications network in accordance with claim 1 wherein each RT processor is operative to sort entries in said RT table in a descending order based on signal strength, and said sign-on message is sent to the BS having the strongest signal strength indicated in said table.

3. A digital communications network in accordance with claim 2 wherein said sign-on message includes a list of BSs in said table having the strongest signal strengths, and said BS to which the sign-on message is transmitted selects from such list which BS should be attached to the RT sending said sign-on message.

4. A digital communications network in accordance with claim 1 wherein each of said transceivers comprises:
a transmitter,
a receiver,
and an antenna connected to said transmitter and to said receiver for transmitting and receiving messages to and from said BSs.

5. A digital communications network in accordance with claim 1 wherein:
each BS comprises means for monitoring how many RTs are covered by a BS, and said decision making means of the BS is connected to said monitoring means so as to make an attachment decision based at least in part on how many RTs are covered by the BS.

6. A digital communications network in accordance with claim 5 wherein said network comprises:
storage means for storing indications of which RTs are attached to which BSs;
said decision making means being further operative to determine from said indications how many RTs are attached to each BS in said list of BSs identified in each sign-on message and make an attachment decision based at least in part on such determination.

7. A digital communications network in accordance with claim 6 wherein:
said storage means is in said CC;
and each BS is operative in response to making an attachment decision of transmitting to and storing in said storage means identifications of which BSs are attached to which RTs.

8. A digital communications network in accordance with claim 7 wherein said host computer sends messages to RTs by routing each message through said CC, and identifies in each message the RT to which the message is to be sent;
said CC being operative in response to receipt of such message to look up in said storage means which BS is attached to the RT identified in the message and then route such message to such BS for transmission to such RT.

9. A digital communications network in accordance with claim 7 wherein an attachment decision is made by selecting the BS having the lowest WEIGHT value determined in accordance with the following formula:

$$\text{WEIGHT}[n] = (s * CT[n]) + (t * \text{USERS}[n])$$

where
WEIGHT[n] is the WEIGHT value for a given BS[n],
CT[n] is the total number of RTs which base station BS[n] can hear,
USERS[n] is the number of users attached to BS[n], and "s" and "t" are optimization constants.

10. A digital communications network in accordance with claim 9 wherein each BS storage includes a table for storing WEIGHT values for each BS attached to said CC.

11. A digital communications network in accordance with claim 9 wherein the value USERS[n] is obtained from said storage means in said CC.

12. A digital communications network in accordance with claim 1 wherein said CC comprises a plurality of message queues for storing messages to be sent from said CC to said host computer, there being one message queue for each BS connected to said CC;
each BS being operative to transmit to said CC all messages received from any RT whereby said message queues may contain duplicate messages from the same RT.

13. A digital communications network in accordance with claim 12 wherein said CC is operative to recognize duplicate messages and send only one of said duplicate messages to said host computer.

14. A digital communications network in accordance with claim 13 wherein said messages stored in said queues include identifications of which RT sent each message, said CC being operative upon analyzing a message in a queue and determining such message is from an RT attached to said BS corresponding to such queue to send such message to said host computer and discard any duplicate messages in other queues.

15. A digital communications network in accordance with claim 13 wherein said CC is operative in response to analyzing a message in a given queue to determine that such message was intended for a BS corresponding to a different queue and in response to such determination search through said different queue for the same message.

16. A digital communications network in accordance with claim 15 wherein said CC is further operative in response to said search to move said message from said given queue into said different queue when such message is not found by such search, and to discard said message in said given when such message if found in said different queue.

17. A digital communications network in accordance with claim 1 wherein each RT includes error monitoring means operative to detect errors in messages sent from a BS attached thereto and request a new sign-on when the number of errors thus detected exceeds a predetermined value.

* * * * *